US012681911B2

(12) United States Patent
Chen et al.

(10) Patent No.: US 12,681,911 B2
(45) Date of Patent: Jul. 14, 2026

(54) PROCESSING METHOD OF DATA QUALITY DYNAMIC INFORMATION AND DATA PROCESSING DEVICE

(71) Applicants:Inventec (Pudong) Technology Corp., Shanghai (CN); Inventec Corporation, Taipei (TW)

(72) Inventors: Wei-Chao Chen, Taipei (TW); Ming-Chi Chang, Taipei (TW); Shu-Huei Yang, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 19/232,874

(22) Filed: Jun. 10, 2025

(65) Prior Publication Data

US 2026/0079899 A1     Mar. 19, 2026

(30) Foreign Application Priority Data

Sep. 19, 2024    (CN) .......................... 202411315178.5

(51) Int. Cl.
G06F 16/215        (2019.01)
G06F 16/22        (2019.01)
(52) U.S. Cl.
CPC ........ G06F 16/215 (2019.01); G06F 16/2282 (2019.01)

(58) Field of Classification Search
CPC .......................... G06F 16/215; G06F 16/2282
USPC ......................................................... 707/690
See application file for complete search history.

(56) References Cited

U.S. PATENT DOCUMENTS

2015/0310754 A1* 10/2015 Bilic ................... G06F 16/2379
                                                                                 434/322
2019/0286621 A1*  9/2019 Hall ...................... G06F 16/215

* cited by examiner

*Primary Examiner* — Cam Y T Truong
(74) *Attorney, Agent, or Firm* — Winston Hsu

(57) ABSTRACT

A data processing device is provided, which includes a storage device and a data quality assessment measurement calculation module. The storage device is configured to obtain change data of data tables from a data center. The data quality assessment measurement calculation module is configured to calculate an updated data quality assessment measurement value and an updated data quality characteristic data according to the change data and a data quality assessment measurement reference value and perform a notification function according to the updated data quality assessment measurement value and a data quality threshold value. The data quality assessment measurement calculation module is configured to compare the updated data quality assessment measurement value with the data quality threshold value to generate a comparison result. The data quality assessment measurement calculation module is configured to generate and send a notification signal to perform a notification function according to the comparison result.

12 Claims, 4 Drawing Sheets

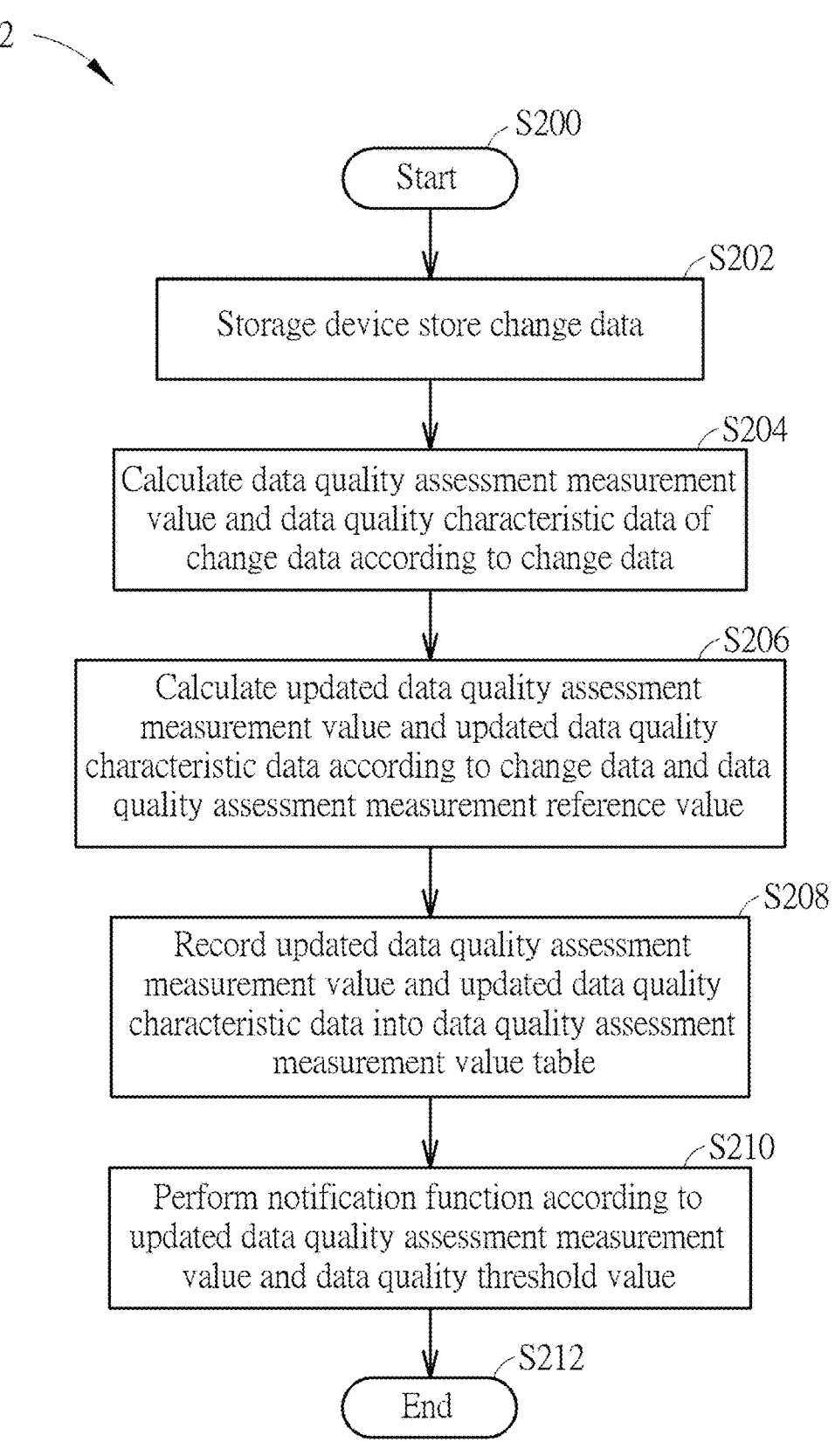

2

S200
Start

S202
Storage device store change data

S204
Calculate data quality assessment measurement value and data quality characteristic data of change data according to change data S206
Calculate updated data quality assessment measurement value and updated data quality characteristic data according to change data and data quality assessment measurement reference value S208
Record updated data quality assessment measurement value and updated data quality characteristic data into data quality assessment measurement value table S210
Perform notification function according to updated data quality assessment measurement value and data quality threshold value S212
End

FIG. 2

PROCESSING METHOD OF DATA QUALITY DYNAMIC INFORMATION AND DATA PROCESSING DEVICE

BACKGROUND OF THE INVENTION

1. Field of the Invention

The present invention relates to a processing method of data quality dynamic information and a data process device, and more particularly, to a processing method of data quality dynamic information and a data process device capable of facilitating research and development of digital transformation.

2. Description of the Prior Art

Data quality measures how well data contents in data tables are fit for purpose. The data quality measurement can help to evaluate whether the data table is worth investing in data analysis, data mining or digital application development. However, there is no commonly standard definition of data quality, which usually depends on the purpose of data. For example, training artificial intelligence models usually requires large amounts of data. The amount of data in data tables is often insufficient to train the artificial intelligence models. Before conducting data analysis, data mining, or digital application development, the data user must continue to check whether the data quality is good enough for doing research and development in order to avoid wasting the research and development costs of digital transformation. However, a data center usually contains data tables with large amounts of data, and the amount of data may also be continuously increased and updated. In order to start research and development work as quickly as possible, the data user needs to download all the data in huge data tables to the local computer every day for calculating data quality. Thus, this may consume too much computing resources of the data center and the data user, and also easily affect whole system information security. Therefore, there is a need for improvement.

SUMMARY OF THE INVENTION

It is therefore a primary objective of the present invention to provide a processing method of data quality dynamic information and a data process device capable of facilitating research and development of digital transformation, in order to resolve the aforementioned problems.

The present invention discloses a data processing device, comprising: a storage device, configured to obtain and store change data of data tables from a data center; a data quality assessment measurement calculation module, configured to calculate an updated data quality assessment measurement value and updated data quality characteristic data according to the change data and a data quality assessment measurement reference value, record the updated data quality assessment measurement value and the updated data quality characteristic data into a data quality assessment measurement value table, and perform a notification function according to the updated data quality assessment measurement value and a data quality threshold value; wherein the data quality assessment measurement calculation module is configured to compare the updated data quality assessment measurement value with the data quality threshold value to generate a comparison result, generate and send a notification signal to perform the notification function when the comparison result indicates that the updated data quality assessment measurement value is greater than or equal to the data quality threshold value.

The present invention further discloses a processing method of data quality dynamic information, comprising: obtaining and storing change data from a data center; calculating a data quality assessment measurement value and data quality characteristic data of the change data according to the change data; calculating an updated data quality assessment measurement value and updated data quality characteristic data according to the data quality assessment measurement value and data quality characteristic data of the change data and a data quality assessment measurement reference value; recording the updated data quality assessment measurement value and the updated data quality characteristic data into a data quality assessment measurement value table; and performing a notification function according to the updated data quality assessment measurement value and a data quality threshold value, comprising: comparing the updated data quality assessment measurement value with the data quality threshold value to generate a comparison result; generating and sending a notification signal to perform the notification function when the comparison result indicates that the updated data quality assessment measurement value is greater than or equal to the data quality threshold value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a flow diagram of a procedure according to an embodiment of the present invention.

DETAILED DESCRIPTION

Figure 1:
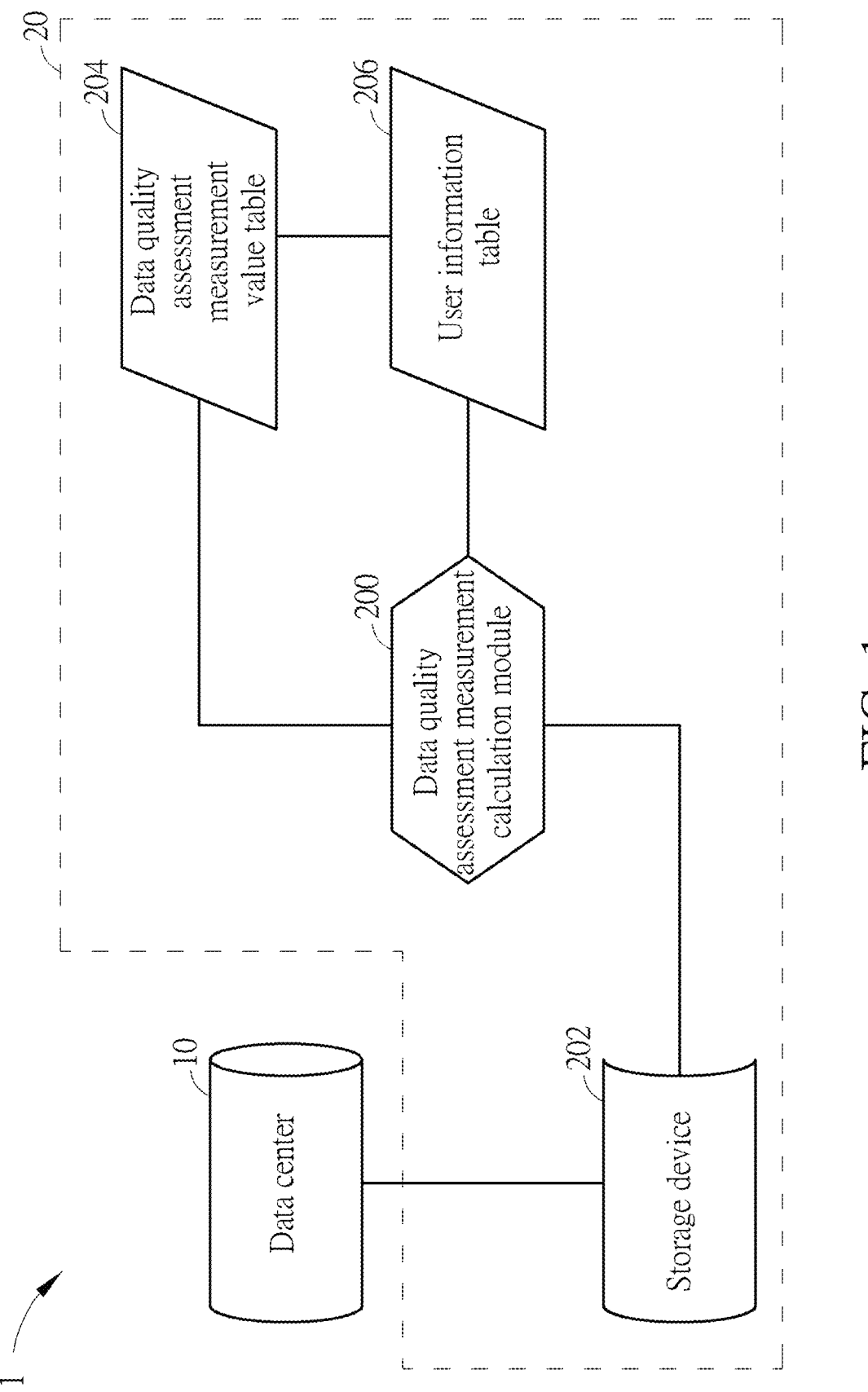
FIG. 1 is a schematic diagram of a data processing system according to an embodiment of the present invention.

Please refer to FIG. 1, which is a schematic diagram of a data processing system 1 according to an embodiment of the present invention. The data processing system 1 includes a data center 10 and a data processing device 20. The data center 10 is utilized for storing a plurality of data tables. The data center 10 may include databases that store data tables. The data center 10 may include a plurality of networked computer devices that work together to process, store and share data. The data processing device 20 of the embodiment of the present invention allows data users of the data center 10 to automatically track and evaluate the data quality of data tables without occupying the computing resources of the data center 10, and thus significantly promoting and facilitating improvements in research and development of the digital transformation.

The data process device 20 includes a data quality assessment measurement calculation module 200, a storage device 202, a data quality assessment measurement value table 204 and a user information table 206. The storage device 202 can store data. For example, the storage device 202 can store change data associated with the data center 10. The change data may include new data to be added to the plurality of data tables of the data center 10. The change data may include deleted data to be removed from the plurality of data tables of data center 10. The data quality assessment measurement calculation module 200 can access the data stored in the storage device 202. The data quality assessment measurement calculation module 200 can also receive and process data from an external device. The data quality assessment measurement calculation module 200 may be a main controller or a processing device, such as central processing unit (CPU), microprocessor, or micro controller unit (MCU), but not limited thereto. The data quality assessment measurement calculation module 200 may access data contents of the data quality assessment measurement value table 204 and the user information table 206. Related data may be recorded into the data quality assessment measurement value table 204 and the user information table by the data quality assessment measurement calculation module 200. The data quality assessment measurement calculation module 200 is configure to calculate an updated data quality assessment measurement value and updated data quality characteristic data according to the change data and a data quality assessment measurement reference value, and record the updated data quality assessment measurement value and the updated data quality characteristic data into the data quality assessment measurement value table 204. The data quality assessment measurement value table 204 includes all tables utilized for calculating data quality related information of the data tables of the data center 10. The data quality assessment measurement value table 204 includes information of data table name, data table field name, data change behavior, data quality assessment measurement value, data quality assessment characteristic data and update time. The user information table 206 includes tables of user setting information. The user information table 206 includes information of user account, data table name, data field name, data quality measurement name, data quality threshold value and terminal device (user device) to be notified.

The embodiments of the present invention can automatically and dynamically track and evaluate the changes in data quality of the data tables for the data center 10 through the data processing device 20, without having to reacquire the overall system data of the data center each time to evaluate the overall data quality. Please refer to FIG. 2, which is a flow diagram of a procedure 2 according to an embodiment of the present invention. The procedure 2 includes the following steps:

Step S200: Start.

Step S202: Storage device stores change data.

Step S204: Calculate the data quality assessment measurement value and the data quality characteristic data of the change data according to the change data.

Step S206: Calculate an updated data quality assessment measurement value and updated data quality characteristic data according to the change data and a data quality assessment measurement reference value.

Step S208: Record the updated data quality assessment measurement value and the updated data quality characteristic data into a data quality assessment measurement value table.

Step S210: perform a notification function according to the updated data quality assessment measurement value and a data quality threshold value.

Step S212: End.

According to the procedure 2, in Step S202, the data center 10 may notify the data processing device 20 of data change information (including addition, deletion and update) associated with all data tables in the data center 10. When receiving the data change information of the data tables from the data center 10, the data processing device 20 may store change data and the data change information of the data tables. The change data may include new data to be added to the plurality of data tables of the data center 10 and deleted data to be removed from the plurality of data tables of data center 10. For example, the data center 10 may transmit the data change information of the data tables and the change data including the new data to be added to the data tables or the deleted data to be deleted from the data tables to the storage device 202 for storage. For example, the storage device 202 may access the data center 10 according to the received data change information of the data tables so as to obtain the change data (e.g., new data to be added to the data tables and deleted data to be deleted from the data tables) from the data center 10 and store the obtained change data.

In Step S204, the data quality assessment measurement calculation module 200 may read the change data stored in the storage device 202, and calculate a data quality assessment measurement value and data quality characteristic data of the change data according to the change data. For example, the data quality assessment measurement value includes a mean measurement value. The data quality assessment measurement calculation module 200 may calculate a mean value of the change data for acting as the data quality assessment measurement value of the change data. For example, the data quality assessment measurement value includes a population variance measurement value. The data quality assessment measurement calculation module 200 may calculate a population variance of the change data for acting as the data quality assessment measurement value of the change data. In addition, after the data quality assessment measurement calculation module 200 reads the change data stored in the storage device 202, the storage device 202 may release the space for storing data to save the storage space.

In Step S206, the data quality assessment measurement calculation module 200 may calculate an updated data quality assessment measurement value and updated data quality characteristic data according to the change data and a data quality assessment measurement reference value. The data quality assessment measurement reference value includes a data quality assessment measurement value before update and data quality characteristic data before update. The data quality assessment measurement value table 204 stores the latest data quality assessment measurement reference values. The data quality assessment measurement value table 204 records the data quality assessment measurement reference value before the changed data is updated to the data center 10 (e.g., the data quality assessment measurement value before update and the data quality characteristic data before update). The data quality assessment measurement calculation module 200 may access the data quality assessment measurement value table 204 to obtain the data quality assessment measurement value before update and the data quality characteristic data before update. The data quality assessment measurement calculation module 200 may calculate the updated data quality assessment measurement value and the updated data quality characteristic data based on a function associated with the data quality assessment measurement value before update, the data quality characteristic data before update, the data quality assessment measurement value of the change data and the data quality characteristic data of the change data.

The updated data quality assessment measurement value and updated data quality characteristic data may be expressed as follows:

$$M_{new} = F_M(M_{Ori}, M_{change}, C_{Ori}, C_{change}) \tag{1}$$

$$C_{new} = F_C(C_{Ori}, C_{change})$$

where $M_{new}$ represents the updated data quality assessment measurement value, $M_{Ori}$ represents the data quality assessment measurement value before update, $M_{change}$ represents the data quality assessment measurement value of the change data, $FM(\cdot)$ and $FC(\cdot)$ represent functions, $C_{new}$ represents the updated data quality characteristic data, $C_{Ori}$ represents the data quality characteristic data before update, $C_{change}$ represents the data quality characteristic data of the change data.

In an embodiment, the data quality assessment measurement value before update includes a missing value ratio (MR) measurement value before update. The data quality assessment measurement value of the change data includes a missing value ratio measurement value of the change data. The updated data quality assessment measurement value com includes an updated missing value ratio measurement value. The data quality assessment measurement calculation module 200 is configured to calculate the updated missing value ratio measurement value and the updated data quality characteristic data according to the missing value ratio measurement value before update, the data quality characteristic data before update, the missing value ratio measurement value of the change data and the data quality characteristic data of the change data. When the change data is the new data to be added to the plurality of data tables, the updated missing value ratio measurement value and the updated data quality characteristic data may be calculated by the data quality assessment measurement calculation module 200 according to the following equations:

$$MR_{new} = \frac{N}{N+k}MR_{Ori} + \frac{k}{N+k}MR_{change} \tag{2}$$

$$C_{new} = C_{Ori} + C_{change}$$

where $MR_{new}$ represents the updated missing value ratio measurement value, $MR_{Ori}$ represents the missing value ratio measurement value before update, $MR_{change}$ represents the missing value ratio measurement value of the change data, $C_{new}$ represents the updated data quality characteristic data, $C_{Ori}$ represents the data quality characteristic data before update, $C_{change}$ represents the data quality characteristic data of the change data, N represents the amount of data used to calculate the data quality assessment measurement value before update, wherein the data amount N may be the amount of data used to calculate the data quality assessment measurement value before update before the data tables of the data center 10 are updated, wherein $C_{Ori}$=N, k represents the amount of data used to calculate the data quality assessment measurement value of the change data, wherein $C_{change}$=k.

When the change data is the deleted data to be removed from the plurality of data tables, the updated missing value ratio measurement value and the updated data quality characteristic data may be calculated by the data quality assessment measurement calculation module 200 according to the following equations:

$$MR_{new} = \frac{N}{N-k}MR_{Ori} - \frac{k}{N-k}MR_{change} \tag{3}$$

$$C_{new} = C_{Ori} - C_{change}$$

where $C_{Ori}$=N, $C_{change}$=k.

In an embodiment, the data quality assessment measurement value before update includes a mean measurement value before update and a population variance measurement value before update. The data quality assessment measurement value of the change data includes a mean measurement value and a population variance measurement value of the change data. The updated data quality assessment measurement value includes an updated mean measurement value and an updated population variance measurement value. The data quality assessment measurement calculation module 200 is configured to calculate the updated mean measurement value, the updated population variance measurement value and the updated data quality characteristic data according to the mean measurement value before update, the population variance measurement value before update, the data quality characteristic data before update, the mean measurement value of the change data, the population variance measurement value of the change data and the data quality characteristic data of the change data. When the change data is the new data to be added to the plurality of data tables, the updated mean measurement value, the updated population variance measurement value and the updated data quality characteristic data may be calculated by the data quality assessment measurement calculation module 200 according to the following equations:

$$\mu_{new} = \frac{N}{N+k}\mu_{Ori} + \frac{k}{N+k}\mu_{change} \tag{4}$$

$$\sigma_{new}^2 = \frac{N}{N+k}\sigma_{Ori}^2 + \frac{k}{N+k}\sigma_{change}^2 + \left(\frac{N}{N+k}\mu_{Ori}^2 + \frac{k}{N+k}\mu_{change}^2 - \mu_{new}^2\right)$$

$$C_{new} = C_{Ori} + C_{change}$$

where $\mu_{new}$ represents the updated mean measurement value, $\mu_{Ori}$ represents the mean measurement value before update, $\mu_{change}$ represents the mean measurement value of the change data, $\sigma_{new}^2$ represents, the updated population variance measurement value, $\sigma_{Ori}^2$ represents the population variance measurement value before update, $\sigma_{change}^2$ represents the population variance measurement value of the change data, $C_{new}$ represents the updated data quality characteristic data, $C_{Ori}$ represents the data quality characteristic data before update, $C_{change}$ represents the data quality characteristic data of the change data, N represents the amount of data used to calculate the mean measurement value before update and the population variance measurement value before update, wherein $C_{Ori}$=N, k represents the amount of data used to calculate the mean measurement value and the population variance measurement value of the change data, wherein $C_{change}$=k.

When the change data is the deleted data to be removed from the plurality of data tables, the updated mean measurement value, the updated population variance measurement value and the updated data quality characteristic data may be calculated by the data quality assessment measurement calculation module 200 according to the following equations:

$$\mu_{new} = \frac{N}{N-k}\mu_{Ori} - \frac{k}{N-k}\mu_{change} \tag{5}$$

$$\sigma^2_{new} = \frac{N}{N-k}\sigma^2_{Ori} - \frac{k}{N-k}\sigma^2_{change} + \left(\frac{N}{N-k}\mu^2_{Ori} - \frac{k}{N-k}\mu^2_{change} - \mu^2_{new}\right)$$

$$C_{new} = C_{Ori} - C_{change}$$

where $C_{change}$=k.

In an embodiment, the data quality assessment measurement value before update includes a population correlation coefficient measurement value before update. The data quality assessment measurement value of the change data includes a population correlation coefficient measurement value of the change data. The updated data quality assessment measurement value includes an updated population correlation coefficient measurement value. The data quality assessment measurement calculation module 200 is configured to calculate the updated population correlation coefficient measurement value and the updated data quality characteristic data according to the population correlation coefficient measurement value before update, the data quality characteristic data before update, the population correlation coefficient measurement value of the change data and the data quality characteristic data of the change data. When the change data is the new data to be added to the plurality of data tables, the updated population correlation coefficient measurement value and the updated data quality characteristic data may be calculated by the data quality assessment measurement calculation module 200 according to the following equations:

$$\rho_{new} = \frac{1}{\sigma_{x\_new}\sigma_{y\_new}}\left[\frac{N}{N+k}(\sigma_{x\_Ori}\sigma_{y\_Ori}\rho_{Ori} + \tag{6}\right.$$

$$(\mu_{x\_Ori} - \mu_{y\_new})(\mu_{y\_Ori} - \mu_{y\_new})) + \frac{k}{N+k}(\sigma_{x\_change}\sigma_{y\_change}\rho_{change} +$$

$$\left.(\mu_{x\_change} - \mu_{y\_new})(\mu_{y\_change} - \mu_{y\_new}))\right]$$

where $\rho_{new}$ represents the updated population correlation coefficient measurement value, $\rho_{Ori}$ represents the population correlation coefficient measurement value before update, $\rho_{change}$ represents the population correlation coefficient measurement value of the change data, $C_{new}$ represents the updated data quality characteristic data, x and y represent variables (represent various data groups), $\sigma_{x\_new}$ and $\sigma_{y\_new}$ represent updated standard deviations of the variables, $\sigma_{x\_Ori}$ and $\sigma_{y\_Ori}$ represent standard deviations before update of the variables, $\sigma_{x\_change}$ and $\sigma_{y\_change}$ represent standard deviations of the variables of the change data, $\mu_{y\_new}$ represents an updated mean measurement value of the variables, $\mu_{x\_Ori}$ and $\mu_{y\_Ori}$ represent mean measurement values before update of the variables, $\mu_{x\_change}$ and $\mu_{y\_change}$ represent mean measurement values of the variables of the change data, wherein $C_{new}$=(N+k, $\mu_{new}$,$\rho^2_{new}$).

When the change data is the deleted data to be removed from the plurality of data tables, the updated population correlation coefficient measurement value and the updated data quality characteristic data may be calculated by the data quality assessment measurement calculation module 200 according to the following equations:

$$\rho_{new} = \frac{1}{\sigma_{x\_new}\sigma_{y\_new}}\left[\frac{N}{N-k}\right. \tag{7}$$

$$(\sigma_{x\_Ori}\sigma_{y\_Ori}\rho_{Ori} + (\mu_{x\_Ori} - \mu_{y\_new})(\mu_{y\_Ori} - \mu_{y\_new}))$$

$$-\frac{k}{N-k}$$

$$\left.(\sigma_{x\_change}\sigma_{y\_change}\rho_{change} + (\mu_{x\_change} - \mu_{y\_new})(\mu_{y\_change} - \mu_{y\_new}))\right]$$

where $C_{new} = \left(N + k, \mu_{new}, \sigma^2_{new}\right)$.

In an embodiment, the data quality assessment measurement value before update includes a unique value ratio (UR) measurement value before update. The data quality assessment measurement value of the change data includes a unique value ratio measurement value of the change data. The updated data quality assessment measurement value includes an updated unique value ratio measurement value. The data quality assessment measurement calculation module 200 is configured to calculate the updated unique value ratio measurement value and the updated data quality characteristic data according to the unique value ratio measurement value before update, the data quality characteristic data before update, the unique value ratio measurement value of the change data and the data quality characteristic data of the change data. When the change data is the new data to be added to the plurality of data tables, the updated unique value ratio measurement value and the updated data quality characteristic data may be calculated by the data quality assessment measurement calculation module 200 according to the following equations:

$$UR_{new} = \frac{\#(key(C_{ori} \cup C_{change}))}{N+k} \tag{8}$$

$$C_{new} = C_{ori} \cup C_{change}$$

where $UR_{new}$ represents the updated unique value ratio measurement value, U represents the union operation, key (·) represents a key value, # represents counting the number of elements, $MR_{Ori}$ represents the unique value ratio measurement value before update, $MR_{change}$ represents the unique value ratio measurement value of the change data, $C_{new}$ represents the updated data quality characteristic data, $C_{Ori}$ represents the data quality characteristic data before update, $C_{change}$ represents the data quality characteristic data of the change data, N represents the amount of data used to calculate the data quality assessment measurement value before update.

When the change data is the deleted data to be removed from the plurality of data tables, the updated unique value ratio measurement value and the updated data quality characteristic data may be calculated by the data quality assessment measurement calculation module 200 according to the following equations:

$$UR_{new} = \frac{\#(key(C_{ori} - C_{change}))}{N - k} \qquad (9)$$

$$C_{new} = C_{ori} - C_{change}$$

For example, the unique values of data before update $C_{Ori}$={"Ivy": 2, "Ben": 3} represents that there are two unique values ("Ivy" and "Ben") in data, of which "Ivy" is 2 and "Ben" is 3. In addition, the unique values of the change data $C_{change}$={"Ivy": 2, "Ben": 1} represents that there are two unique values ("Ivy" and "Ben") in data, of which "Ivy" is 2 and "Ben" is 1. In such a situation, the calculation result may be $C_{Ori} \cup C_{change}$={"Ivy": 4, "Ben": 4} according to equation (8), and the calculation result may be $C_{Ori}-C_{change}$={"Ben": 2} according to equation (9).

In other words, as the information of the change data is obtained, the embodiments of the present invention can calculate the updated data quality assessment measurement value and updated data quality characteristic data according to the change data and the data quality assessment measurement reference value before the update, so as to real time identify the current data quality without having to reacquire the overall system data of the data center. For the data center, the data center only needs to provide the information of change data, including the new data added to the data tables and the deleted data removed from the data tables, to the data processing device 20, thus significantly reducing the computing resources of the data center.

Figure 3:
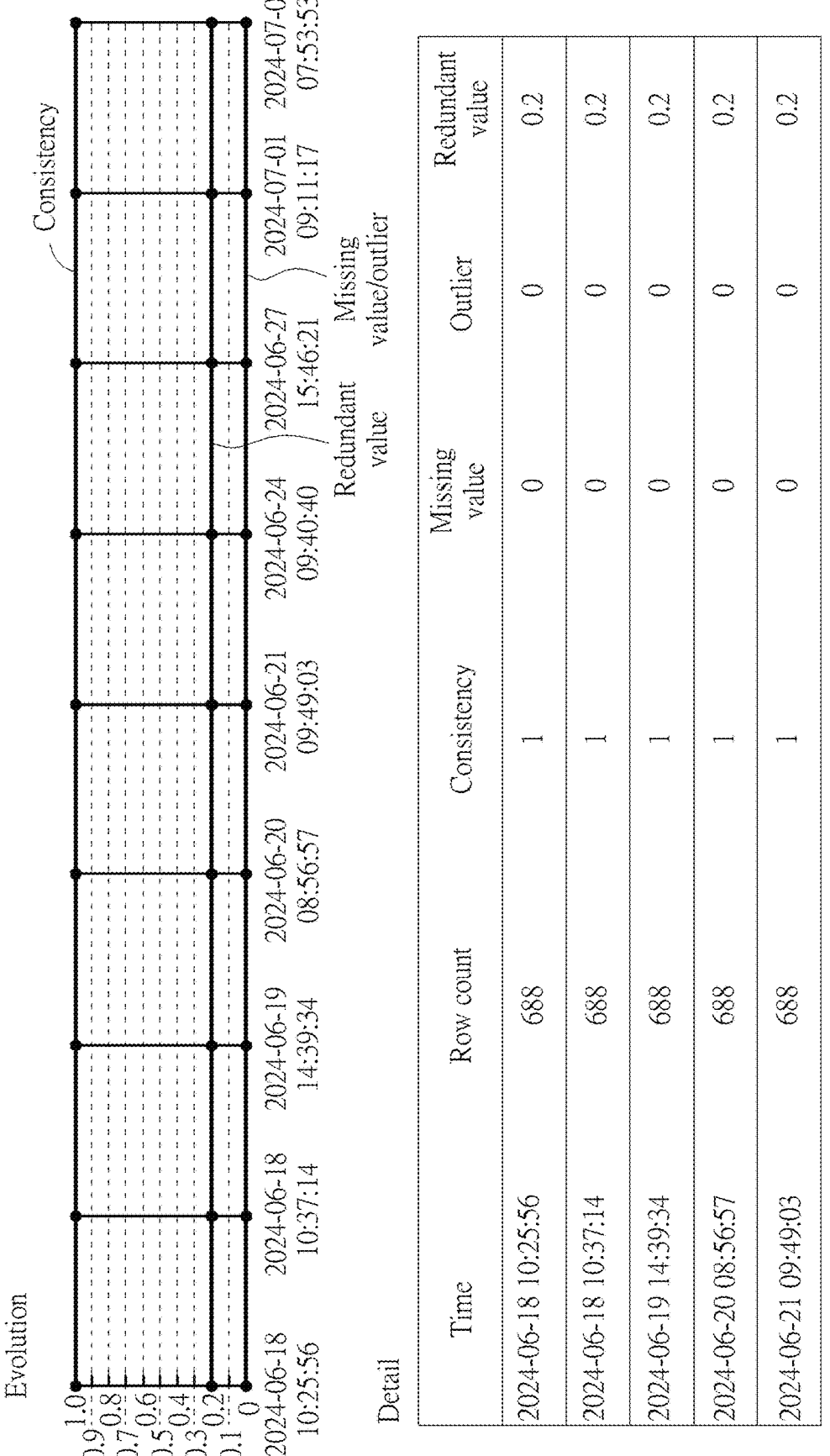
FIG. 3 is a schematic diagram of visually representing data quality information through a user interface according to an embodiment of the present invention.

In Step S208, the data quality assessment measurement calculation module 200 may record the updated data quality assessment measurement value and the updated data quality characteristic data into the data quality assessment measurement value table 204. When the following data changes in the data tables of the data center 10 occur, the updated data quality assessment measurement value and the updated data quality characteristic data stored in the data quality assessment measurement value table 204 can be utilized as the information of the data quality assessment measurement value information before update. On the other hand, the data processing system 1 further includes a user interface, which can be utilized to provide a visualization service for querying the data quality assessment measurement value table 204. For example, please refer to FIG. 3, which is a schematic diagram of visually representing data quality information through a user interface according to an embodiment of the present invention. As shown in FIG. 3, the user interface can visualize the row count, consistency, outlier, missing value, and redundant information of the data tables associated with the data center 10. The user interface may also provide a setting interface for related functions (such as an automated notification function), allowing the user to input and set required contents.

Figure 4:
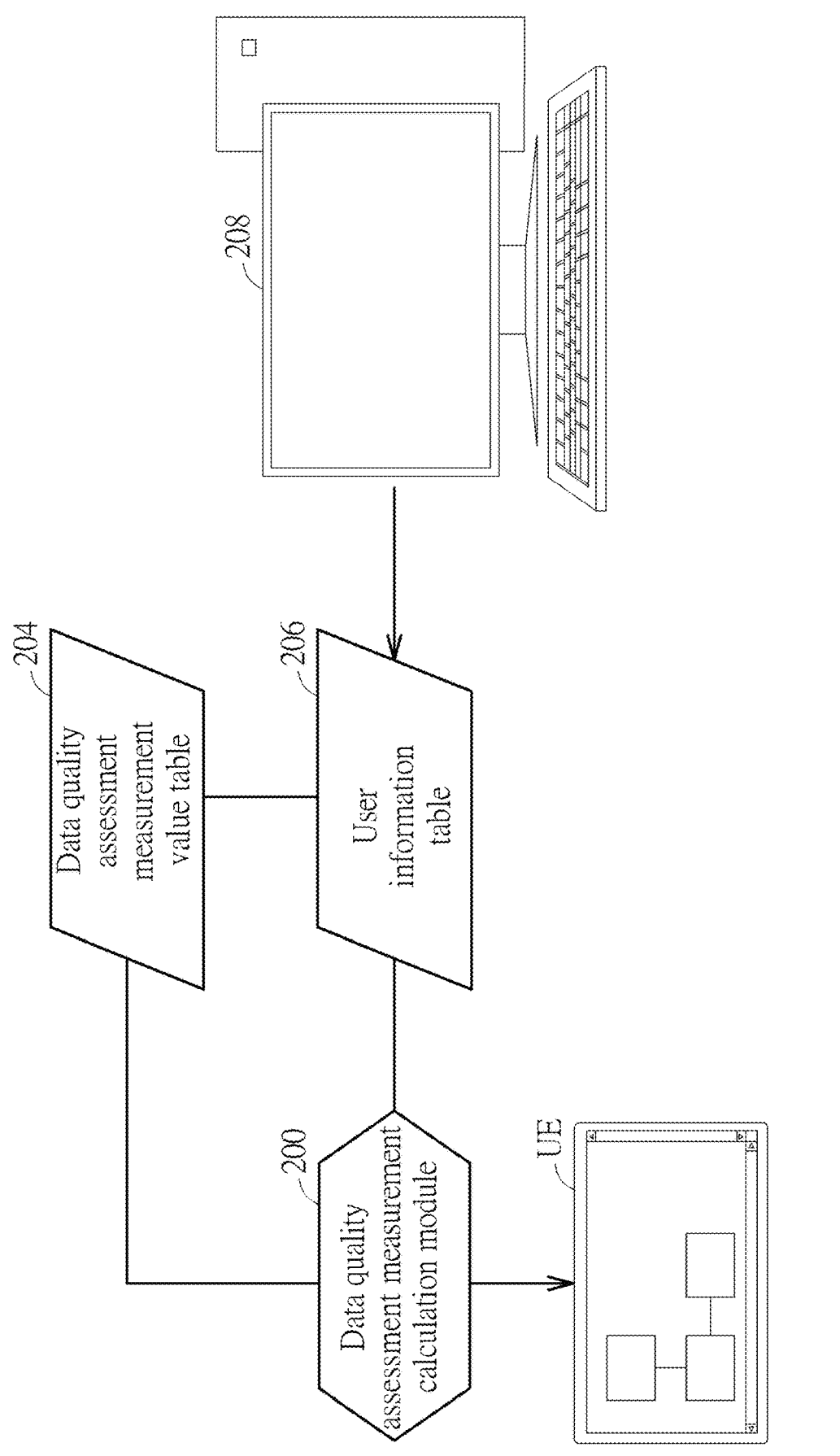
FIG. 4 is a schematic diagram of automatically notifying data quality information according to an embodiment of the present invention.

In Step S210, the data quality assessment measurement calculation module 200 can determine whether to perform a notification function according to the updated data quality assessment measurement value and a data quality threshold value. The data quality assessment measurement calculation module 200 can compare the updated data quality assessment measurement value with the data quality threshold value to generate a comparison result. When the comparison result indicates that the updated data quality assessment measurement value is greater than or equal to the data quality threshold value, the data quality assessment measurement calculation module 200 can generate and send a notification signal to a user device (user device may be pre-set) to remind the user that the data quality has reached the expected quality level. For example, please refer to FIG. 4, which is a schematic diagram of automatically notifying data quality information according to an embodiment of the present invention. As shown in FIG. 4, the data processing system 1 provides a user interface 208 for the user to input and set the required data quality threshold value. The user can input the data quality threshold value into the user information table 206 through the user interface 208, and the data quality assessment measurement calculation module 200 can access the user information table 206 to obtain the data quality threshold value and information of the user device to be notified. The data quality assessment measurement calculation module 200 can access the d data quality assessment measurement value table 204 to obtain the updated data quality assessment measurement value. Further, the data quality assessment measurement calculation module 200 can compare the updated data quality assessment measurement value with the data quality threshold value to generate a comparison result. When the comparison result indicates that the updated data quality assessment measurement value is greater than or equal to the data quality threshold value, the data quality assessment measurement calculation module 200 can generate and send a notification signal to a user device UE to inform the administrator, engineer or user of the data center that the data quality has reached the expected quality level and related research and development projects can begin immediately for performing the notification function. For example, the data quality assessment measurement calculation module 200 can utilizes communication software, such as E-mail, Teams, to notify the data user of the user device UE that the current data quality assessment measurement value has exceeded the data quality threshold value. Therefore, the data user can start to conduct the research and development work in data analysis, data mining or digital application at the earliest possible time.

Therefore, since the data quality threshold value is inputted into the user information table 206 by the user, the data processing device 20 of the embodiments of the present invention can calculate the latest data quality assessment measurement value according to the change data in the data center 10 when data changes in the data center 10. Moreover, the data processing device 20 of the embodiments can be joined and connected to the user information table 206, so as to obtain the data quality threshold value for evaluating whether the updated data quality assessment measurement value reaches the data quality threshold value. When the data quality reaches the quality level set by the user, the embodiments of the present invention can perform the notification function to notify the predetermined user device for realizing a customized automatic notification function. Therefore, the user does not need to monitor the changes in data quality all the time.

Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, the data processing system 1 or combination thereof. Examples of hardware can include analog, digital and/or mixed circuits known as microcircuit, microchip, or silicon chip. For example, the hardware may include application-specific integrated circuit (ASIC), field programmable gate array (FPGA), programmable logic device, coupled hardware components or combination thereof. In another example, the hardware may include general-purpose processor, microprocessor, controller, digital signal processor (DSP) or combination thereof. Examples of the software may include set(s) of codes, set(s) of instructions and/or set(s) of functions retained (e.g., stored) in a storage device, e.g., a computer-readable storage medium or a non-transitory computer-readable medium. For example, the computer-readable storage medium may include read-only memory (ROM), flash memory, random access memory (RAM), subscriber identity module (SIM), hard disk, floppy diskette, or CD-ROM/DVD-ROM/BD-ROM, but not limited thereto. The data processing system 1 of the embodiments of the invention may include a processing circuit and the storage device 202. Any of the abovementioned procedures and examples above may be compiled into program codes or instructions that are stored in the storage device 202 or a computer-readable medium. The processing circuit may read and execute the program codes or the instructions stored in the storage device 202 or computer-readable medium for realizing the abovementioned functions.

To sum up, the embodiments of the present invention provide a data processing device that allows the data user of data center to automatically track and evaluate the data quality of the data tables. As the information of the change data is obtained, the embodiments of the present invention can calculate the current data quality assessment measurement value without having to reacquire the overall system data of the data center. When the data quality reaches the desired data quality threshold value, the embodiments of the present invention can perform the notification function to notify the predetermined user device for realizing the customized automatic notification function. For the data center, the data center only needs to provide the information of change data, including new data added to the data tables and deleted data removed from the data tables, to the data processing device, and thus significantly reducing the computing resources of the data center and facilitating research and development of digital transformation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing device, comprising:
a computer-readable storage medium storing computer-executable instructions; and one or more processors to execute the computer-executable instructions to perform a process comprising:
obtaining and storing, in a storage device, change data received from a data center that includes one or more networked computer devices, wherein the change data comprises new data to be added to a plurality of data tables stored in a database or deleted data to be removed from the plurality of data tables;
in response to reading the change data stored in the storage device:
when the change data is the new data to be added to the data tables, automatically calculating, by a data quality assessment measurement calculation module executed on a computer system, a data quality assessment measurement value and data quality characteristic data of the change data according to the change data and based on a function associated with the data quality assessment measurement value before update, wherein the data quality assessment measurement value comprises a population variance measurement value of the change data and a missing value ratio measurement value before update;
when the change data is the deleted data to be removed from the data tables, automatically calculating, by a data quality assessment measurement calculation module, based on a function associated with the data quality assessment measurement value before update an updated data quality assessment measurement value and updated data quality characteristic data according to the data quality assessment measurement value, the data quality characteristic data of the change data and a data quality assessment measurement reference value, wherein the updated data quality assessment measurement value comprises an updated population variance measurement value and an updated missing value ratio measurement value determined according to the missing value ratio measurement value before update;
recording the updated data quality assessment measurement value and the updated data quality characteristic data into a data quality assessment measurement value table; and
automatically performing a notification function according to the updated data quality assessment measurement value and a data quality threshold value, the performing of the notification function comprising:
comparing the updated data quality assessment measurement value with the data quality threshold value to generate a comparison result;
generating and sending a notification signal to a user device to inform a user of the data center that data quality has reached an expected quality level for performing the notification function when the comparison result indicates that the updated data quality assessment measurement value is greater than or equal to the data quality threshold value.

2. The data processing device of claim 1,
the data quality assessment measurement reference value comprises a data quality assessment measurement value before update and data quality characteristic data before update, and the data quality assessment measurement calculation module is configured to calculate the updated data quality assessment measurement value and the updated data quality characteristic data based on a function associated with the data quality assessment measurement value before update, the data quality characteristic data before update, the data quality assessment measurement value of the change data and the data quality characteristic data of the change data.

3. The data processing device of claim 2, wherein the data quality assessment measurement value before update comprises a missing value ratio measurement value before update, the data quality assessment measurement value of the change data comprises a missing value ratio measurement value of the change data, the updated data quality assessment measurement value comprises an updated missing value ratio measurement value, the data quality assessment measurement calculation module is configured to calculate the updated missing value ratio measurement value and the updated data quality characteristic data according to the missing value ratio measurement value before update, the data quality characteristic data before update, the missing value ratio measurement value of the change data and the data quality characteristic data of the change data, wherein when the change data is the new data to be added to the plurality of data tables, the updated missing value ratio measurement value and the updated data quality characteristic data are calculated by the data quality assessment measurement calculation module according to the following equations:

$$MR_{new} = \frac{N}{N+k}MR_{Ori} + \frac{k}{N+k}MR_{change}$$

$$C_{new} = C_{Ori} + C_{change}$$

where $MR_{new}$ represents the updated missing value ratio measurement value, $MR_{Ori}$ represents the missing value ratio measurement value before update, $MR_{change}$ represents the missing value ratio measurement value of the change data, $C_{new}$ represents the updated data quality characteristic data, $C_{Ori}$ represents the data quality characteristic data before update, $C_{change}$ represents the data quality characteristic data of the change data, N represents the amount of data used to calculate the data quality assessment measurement value before update, wherein $C_{Ori}$=N, k represents the amount of data used to calculate the data quality assessment measurement value of the change data, wherein $C_{change}$=k;

wherein when the change data is the deleted data to be removed from the plurality of data tables, the updated missing value ratio measurement value and the updated data quality characteristic data are calculated by the data quality assessment measurement calculation module according to the following equations:

$$MR_{new} = \frac{N}{N-k}MR_{Ori} - \frac{k}{N-k}MR_{change}$$

$$C_{new} = C_{Ori} - C_{change}.$$

4. The data processing device of claim 2, wherein the change data comprises new data to be added to the plurality of data tables or deleted data to be removed from the plurality of data tables, the data quality assessment measurement value before update comprises a mean measurement value before update and a population variance measurement value before update, the data quality assessment measurement value of the change data comprises a mean measurement value and a population variance measurement value of the change data, the updated data quality assessment measurement value comprises an updated mean measurement value and updated population variance measurement value, the data quality assessment measurement calculation module is configured to calculate the updated mean measurement value, the updated population variance measurement value and the updated data quality characteristic data according to the mean measurement value before update, the population variance measurement value before update, the data quality characteristic data before update, the mean measurement value of the change data, the population variance measurement value of the change data and the data quality characteristic data of the change data, wherein when the change data is the new data to be added to the plurality of data tables, the updated mean measurement value, the updated population variance measurement value and the updated data quality characteristic data are calculated by the data quality assessment measurement calculation module according to the following equations:

$$\mu_{new} = \frac{N}{N+k}\mu_{Ori} + \frac{k}{N+k}\mu_{change}$$

$$\sigma^2_{new} = \frac{N}{N+k}\sigma^2_{Ori} + \frac{k}{N+k}\sigma^2_{change} + \left(\frac{N}{N+k}\mu^2_{Ori} + \frac{k}{N+k}\mu^2_{change} - \mu^2_{new}\right)$$

$$C_{new} = C_{Ori} + C_{change}$$

where $\mu_{new}$ represents the updated mean measurement value, $\mu_{Ori}$ represents the mean measurement value before update, $\mu_{change}$ represents the mean measurement value of the change data, $\sigma^2_{new}$ represents, the updated population variance measurement value, $\sigma^2_{Ori}$ represents the population variance measurement value before update, $\sigma^2_{change}$ represents the population variance measurement value of the change data, $C_{new}$ represents the updated data quality characteristic data, $C_{Ori}$ represents the data quality characteristic data before update, $C_{change}$ represents the data quality characteristic data of the change data, N represents the amount of data used to calculate the mean measurement value before update and the population variance measurement value before update, wherein $C_{Ori}$=N, k represents the amount of data used to calculate the mean measurement value and the population variance measurement value of the change data, wherein $C_{change}$=k;

wherein when the change data is the deleted data to be removed from the plurality of data tables, the updated mean measurement value, the updated population variance measurement value and the updated data quality characteristic data are calculated by the data quality assessment measurement calculation module according to the following equations:

$$\mu_{new} = \frac{N}{N-k}\mu_{Ori} - \frac{k}{N-k}\mu_{change}$$

$$\sigma^2_{new} = \frac{N}{N-k}\sigma^2 - \frac{k}{N-k}\sigma^2 + \left(\frac{N}{N-k}\mu_{Ori^2} - \frac{k}{N-k}\mu^2_{change} - \mu^2_{new}\right)$$

$$C_{new} = C_{Ori} - C_{change}.$$

5. The data processing device of claim 2, wherein the change data comprises new data to be added to the plurality of data tables or deleted data to be removed from the plurality of data tables, the data quality assessment measurement value before update comprises a population correlation coefficient measurement value before update, the data quality assessment measurement value of the change data comprises a population correlation coefficient measurement value of the change data, the updated data quality assessment measurement value comprises an updated population correlation coefficient measurement value, the data quality assessment measurement calculation module is configured to calculate the updated population correlation coefficient measurement value and the updated data quality characteristic data according to the population correlation coefficient measurement value before update, the data quality characteristic data before update, the population correlation coefficient measurement value of the change data and the data quality characteristic data of the change data, wherein when the change data is the new data to be added to the plurality of data tables, the updated population correlation coefficient measurement value and the updated data quality characteristic data are calculated by the data quality assessment measurement calculation module according to the following equations:

$$\rho_{new} = \frac{1}{\sigma_{x\_new}\sigma_{y\_new}}\Bigg[$$

$$\frac{N}{N+k}(\sigma_{x\_Ori}\sigma_{y\_Ori}\rho_{Ori} + (\mu_{x\_Ori} - \mu_{y\_new})(\mu_{y\_Ori} - \mu_{y\_new})) +$$

$$\frac{k}{N+k}(\sigma_{x\_change}\sigma_{y\_change}\rho_{change} + (\mu_{x\_change} - \mu_{y\_new})(\mu_{y\_change} - \mu_{y\_new}))\Bigg]$$

where $\rho_{new}$ represents the updated population correlation coefficient measurement value, $\rho_{Ori}$ represents the population correlation coefficient measurement value before update, $\rho_{change}$ represents the population correlation coefficient measurement value of the change data, $C_{new}$ represents the updated data quality characteristic data, x and y represent variables, $\sigma_{x\_new}$ and $\sigma_{y\_new}$ represent updated standard deviations of the variables, $\sigma_{x\_Ori}$ and $\sigma_{y\_Ori}$ represent standard deviations before update of the variables, $\sigma_{x\_change}$ and $\sigma_{y\_change}$ represent standard deviations of the variables of the change data, My new represents an updated mean measurement value of the variables, $\mu_{x\_Ori}$ and $\mu_{y\_Ori}$ represent mean measurement values before update of the variables, $\mu_{x\_change}$ and $\mu_{y\_change}$ represent mean measurement values of the variables of the change data, wherein $C_{new} = (N+k, \mu_{new}, \sigma^2_{new})$;

wherein when the change data is the deleted data to be removed from the plurality of data tables, the updated mean measurement value, the updated population correlation coefficient measurement value and the updated data quality characteristic data are calculated by the data quality assessment measurement calculation module according to the following equations:

$$\rho_{new} =$$

$$\frac{1}{\sigma_{x\_new}\sigma_{y\_new}}\Bigg[\frac{N}{N-k}(\sigma_{x\_Ori}\sigma_{y\_Ori}\rho_{Ori} + (\mu_{x\_Ori} - \mu_{y\_new})(\mu_{y\_Ori} - \mu_{y\_new})) -$$

$$\frac{k}{N-k}(\sigma_{x\_change}\sigma_{y\_change}\rho_{change} + (\mu_{x\_change} - \mu_{y\_new})(\mu_{y\_change} - \mu_{y\_new}))\Bigg].$$

6. The data processing device of claim 2, wherein the data quality assessment measurement value before update comprises a unique value ratio measurement value before update, the data quality assessment measurement value of the change data comprises a unique value ratio measurement value of the change data, the updated data quality assessment measurement value comprises an updated unique value ratio measurement value, the data quality assessment measurement calculation module is configured to calculate the updated unique value ratio measurement value and the updated data quality characteristic data according to the unique value ratio measurement value before update, the data quality characteristic data before update, the unique value ratio measurement value of the change data and the data quality characteristic data of the change data, wherein when the change data is the new data to be added to the plurality of data tables, the updated unique value ratio measurement value and the updated data quality characteristic data are calculated by the data quality assessment measurement calculation module according to the following equations:

$$UR_{new} = \frac{\#(key(C_{ori} \cup C_{change}))}{N+k}$$

$$C_{new} = C_{ori} \cup C_{change}$$

Where $UR_{new}$ represents the updated unique value ratio measurement value, U represents the union operation, key(·) represents a key value, # represents counting the number of elements, $MR_{Ori}$ represents the unique value ratio measurement value before update, $MR_{change}$ represents the unique value ratio measurement value of the change data, $C_{new}$ represents the updated data quality characteristic data, $C_{Ori}$ represents the data quality characteristic data before update, $C_{change}$ represents the data quality characteristic data of the change data, N represents the amount of data used to calculate the data quality assessment measurement value before update;

wherein when the change data is the deleted data to be removed from the plurality of data tables, the updated unique value ratio measurement value and the updated data quality characteristic data are calculated by the data quality assessment measurement calculation module according to the following equations:

$$UR_{new} = \frac{\#(key(C_{ori} - C_{change}))}{N-k}$$

$$C_{new} = C_{ori} - C_{change}.$$

7. A processing method of data quality dynamic information, comprising:

obtaining and storing, in a storage device, change data received from a data center that includes one or more networked computer devices, wherein the change data comprises new data to be added to a plurality of data tables stored in a database or deleted data to be removed from the plurality of data tables;

in response to reading the change data stored in the storage device:

when the change data is the new data to be added to the data tables, automatically calculating, by a data quality assessment measurement calculation module executed on a computer system, a data quality assessment measurement value and data quality characteristic data of the change data according to the change data and based on a function associated with the data quality assessment measurement value before update, wherein the data quality assessment measurement value comprises a population variance measurement value of the change data and a missing value ratio measurement value before update;

when the change data is the deleted data to be removed from the data tables, automatically calculating, by a data quality assessment measurement calculation module, based on a function associated with the data quality assessment measurement value before update an updated data quality assessment measurement value and updated data quality characteristic data according to the data quality assessment measurement value, the data quality characteristic data of the change data and a data quality assessment measurement reference value, wherein the updated data quality assessment measurement value comprises an updated population variance measurement value and an updated missing value ratio measurement value determined according to the missing value ratio measurement value before update;

recording the updated data quality assessment measurement value and the updated data quality characteristic data into a data quality assessment measurement value table; and automatically performing a notification function according to the updated data quality assessment measurement value and a data quality threshold value, the performing of the notification function comprising:

comparing the updated data quality assessment measurement value with the data quality threshold value to generate a comparison result;

generating and sending a notification signal to a user device to inform a user of the data center that data quality has reached an expected quality level for performing the notification function when the comparison result indicates that the updated data quality assessment measurement value is greater than or equal to the data quality threshold value.

8. The processing method of data quality dynamic information of claim 7, wherein the data quality assessment measurement reference value comprises a data quality assessment measurement value before update and data quality characteristic data before update, and the processing method further comprising:

calculating the updated data quality assessment measurement value and the updated data quality characteristic data based on a function associated with the data quality assessment measurement value before update, the data quality characteristic data before update, the data quality assessment measurement value of the change data and the data quality characteristic data of the change data.

9. The processing method of data quality dynamic information of claim 8, wherein the data quality assessment measurement value before update comprises a missing value ratio measurement value before update, the data quality assessment measurement value of the change data comprises a missing value ratio measurement value of the change data, the updated data quality assessment measurement value comprises an updated missing value ratio measurement value, and the processing method further comprising:

calculating the updated missing value ratio measurement value and the updated data quality characteristic data according to the missing value ratio measurement value before update, the data quality characteristic data before update, the missing value ratio measurement value of the change data and the data quality characteristic data of the change data, wherein when the change data is the new data to be added to the plurality of data tables, the updated missing value ratio measurement value and the updated data quality characteristic data are determined according to the following equations:

$$MR_{new} = \frac{N}{N+k}MR_{Ori} + \frac{k}{N+k}MR_{change}$$
$$C_{new} = C_{ori} + C_{change}$$

where $MR_{new}$ represents the updated missing value ratio measurement value, $MR_{Ori}$ represents the missing value ratio measurement value before update, $MR_{change}$ represents the missing value ratio measurement value of the change data, $C_{new}$ represents the updated data quality characteristic data, $C_{Ori}$ represents the data quality characteristic data before update, $C_{change}$ represents the data quality characteristic data of the change data, N represents the amount of data used to calculate the data quality assessment measurement value before update, wherein $C_{Ori}$=N, k represents the amount of data used to calculate the data quality assessment measurement value of the change data, wherein $C_{change}$=k;

wherein when the change data is the deleted data to be removed from the plurality of data tables, the updated missing value ratio measurement value and the updated data quality characteristic data are calculated by the data quality assessment measurement calculation module according to the following equations:

$$MR_{new} = \frac{N}{N-k}MR_{Ori} - \frac{k}{N-k}MR_{change}$$
$$C_{new} = C_{ori} - C_{change}.$$

10. The processing method of data quality dynamic information of claim 8, wherein the change data comprises new data to be added to the plurality of data tables or deleted data to be removed from the plurality of data tables, the data quality assessment measurement value before update comprises a mean measurement value before update and a population variance measurement value before update, the data quality assessment measurement value of the change data comprises a mean measurement value and a population variance measurement value of the change data, the updated data quality assessment measurement value comprises an updated mean measurement value and updated population variance measurement value, and the processing method further comprising:

calculating the updated mean measurement value, the updated population variance measurement value and the updated data quality characteristic data according to the mean measurement value before update, the population variance measurement value before update, the data quality characteristic data before update, the mean measurement value of the change data, the population variance measurement value of the change data and the data quality characteristic data of the change data, wherein when the change data is the new data to be added to the plurality of data tables, the updated mean measurement value, the updated population variance measurement value and the updated data quality characteristic data are determined according to the following equations:

$$\mu_{new} = \frac{N}{N+k}\mu_{Ori} + \frac{k}{N+k}\mu_{change}$$
$$\sigma^2_{new} = \frac{N}{N+k}\sigma^2_{Ori} + \frac{k}{N+k}\sigma^2_{change} +$$
$$\left(\frac{N}{N+k}\mu^2_{Ori} + \frac{k}{N+k}\mu^2_{change} - \mu^2_{new}\right)$$
$$C_{new} = C_{ori} + C_{change}$$

where $\mu_{new}$ represents the updated mean measurement value, $\mu_{Ori}$ represents the mean measurement value before update, $\mu_{change}$ represents the mean measurement value of the change data, $\sigma^2_{new}$ represents, the updated population variance measurement value, $\sigma^2_{Ori}$ represents the population variance measurement value before update, $\sigma^2_{change}$ represents the population variance measurement value of the change data, $C_{new}$ represents the updated data quality characteristic data, $C_{Ori}$ represents the data quality characteristic data before update, $C_{change}$ represents the data quality characteristic data of the change data, N represents the amount of data used to calculate the mean measurement value before update and the population variance measurement value before update, wherein $C_{Ori}$=N, k represents the amount of data used to calculate the mean measurement value and the population variance measurement value of the change data, wherein $C_{change}$=k;

wherein when the change data is the deleted data to be removed from the plurality of data tables, the updated mean measurement value, the updated population variance measurement value and the updated data quality characteristic data are calculated by the data quality assessment measurement calculation module according to the following equations:

$$\mu_{new} = \frac{N}{N+k}\mu_{Ori} + \frac{k}{N+k}\mu_{change}$$

$$\sigma^2_{new} = \frac{N}{N+k}\sigma^2_{Ori} + \frac{k}{N+k}\sigma^2_{change} +$$
$$\left(\frac{N}{N+k}\mu^2_{Ori} + \frac{k}{N+k}\mu^2_{change} - \mu^2_{new}\right)$$

$$C_{new} = C_{ori} + C_{change}.$$

11. The processing method of data quality dynamic information of claim 8, wherein the change data comprises new data to be added to the plurality of data tables or deleted data to be removed from the plurality of data tables, the data quality assessment measurement value before update comprises a population correlation coefficient measurement value before update, the data quality assessment measurement value of the change data comprises a population correlation coefficient measurement value of the change data, the updated data quality assessment measurement value comprises an updated population correlation coefficient measurement value, and the processing method further comprising:

calculating the updated population correlation coefficient measurement value and the updated data quality characteristic data according to the population correlation coefficient measurement value before update, the data quality characteristic data before update, the population correlation coefficient measurement value of the change data and the data quality characteristic data of the change data, wherein when the change data is the new data to be added to the plurality of data tables, the updated population correlation coefficient measurement value and the updated data quality characteristic data are determined according to the following equations:

$$\rho_{new} = \frac{1}{\sigma_{x\_new}\sigma_{y\_new}}\Bigg[$$

$$\frac{N}{N+k}(\sigma_{x\_Ori}\sigma_{y\_Ori}\rho_{Ori} + (\mu_{x\_Ori} - \mu_{y\_new})(\mu_{y\_Ori} - \mu_{y\_new})) +$$

$$\frac{k}{N+k}(\sigma_{x\_change}\sigma_{y\_change}\rho_{change} + (\mu_{x\_change} - \mu_{y\_new})(\mu_{y\_change} - \mu_{y\_new}))\Bigg]$$

where $\rho_{new}$ represents the updated population correlation coefficient measurement value, $\rho_{Ori}$ represents the population correlation coefficient measurement value before update, $\rho_{change}$ represents the population correlation coefficient measurement value of the change data, $C_{new}$ represents the updated data quality characteristic data, x and y represent variables, $\sigma_{x\_new}$ and $\sigma_{y\_new}$ represent updated standard deviations of the variables, $\sigma_{x\_Ori}$ and $\sigma_{y\_Ori}$ represent standard deviations before update of the variables, $\sigma_{x\_change}$ and $\sigma_{y\_change}$ represent standard deviations of the variables of the change data, $\mu_{y\_new}$ represents an updated mean measurement value of the variables, $\mu_{x\_Ori}$ and $\mu_{y\_Ori}$ represent mean measurement values before update of the variables, $\mu_{x\_change}$ and $\mu_{y\_change}$ represent mean measurement values of the variables of the change data, wherein $C_{new}$=(N+k,$\mu_{new}$,$\sigma^2_{new}$);

wherein when the change data is the deleted data to be removed from the plurality of data tables, the updated mean measurement value, the updated population correlation coefficient measurement value and the updated data quality characteristic data are calculated by the data quality assessment measurement calculation module according to the following equations:

$$\rho_{new} =$$

$$\frac{1}{\sigma_{x\_new}\sigma_{y\_new}}\Bigg[\frac{N}{N-k}(\sigma_{x\_Ori}\sigma_{y\_Ori}\rho_{Ori} + (\mu_{x\_Ori} - \mu_{y\_new})(\mu_{y\_Ori} - \mu_{y\_new})) -$$

$$\frac{k}{N-k}(\sigma_{x\_change}\sigma_{y\_change}\rho_{change} + (\mu_{x\_change} - \mu_{y\_new})(\mu_{y\_change} - \mu_{y\_new}))\Bigg].$$

12. The processing method of data quality dynamic information of claim 8, wherein the change data comprises new data to be added to the plurality of data tables or deleted data to be removed from the plurality of data tables, the data quality assessment measurement value before update comprises a unique value ratio measurement value before update, the data quality assessment measurement value of the change data comprises a unique value ratio measurement value of the change data, the updated data quality assessment measurement value comprises an updated unique value ratio measurement value, and the processing method further comprising:

calculating the updated unique value ratio measurement value and the updated data quality characteristic data according to the unique value ratio measurement value before update, the data quality characteristic data before update, the unique value ratio measurement value of the change data and the data quality characteristic data of the change data, wherein when the change data is the new data to be added to the plurality of data tables, the updated unique value ratio measurement value and the updated data quality characteristic data are determined according to the following equations:

$$UR_{new} = \frac{\#(key(C_{ori} \cup C_{change}))}{N+k}$$

$$C_{new} = C_{ori} \cup C_{change}$$

Where $UR_{new}$ represents the updated unique value ratio measurement value, U represents the union operation, key($\cdot$) represents a key value, # represents counting the number of elements, $MR_{Ori}$ represents the unique value ratio measurement value before update, $MR_{change}$ represents the unique value ratio measurement value of the change data, $C_{new}$ represents the updated data quality characteristic data, $C_{Ori}$ represents the data quality characteristic data before update, $C_{change}$ represents the data quality characteristic data of the change data, N represents the amount of data used to calculate the data quality assessment measurement value before update;

wherein when the change data is the deleted data to be removed from the plurality of data tables, the updated unique value ratio measurement value and the updated data quality characteristic data are calculated by the data quality assessment measurement calculation module according to the following equations:

$$UR_{new} = \frac{\#(key(C_{ori} - C_{change}))}{N - k}$$

$$C_{new} = C_{ori} - C_{change}.$$

* * * * *